United States Patent
Anders et al.

(10) Patent No.: US 9,392,067 B2
(45) Date of Patent: Jul. 12, 2016

(54) EFFICIENT AUTOMATIC SHARING OF NETWORK ACCESS AMONG DEVICES

(71) Applicant: Microsoft Corporation, Redmond, WA (US)

(72) Inventors: Billy Anders, Bothell, WA (US); Amer Hassan, Kirkland, WA (US); Aaron Cunningham, Redmond, WA (US); Yatharth Gupta, Kirkland, WA (US); Jonathan Dahlke, Redmond, WA (US); Darene Lewis, Bothell, WA (US); Ulrich Mueller, Redmond, WA (US); Marco Piumatti, Woodinville, WA (US); Ashraf Hamad, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 13/889,341

(22) Filed: May 7, 2013

(65) Prior Publication Data

US 2014/0337923 A1 Nov. 13, 2014

(51) Int. Cl.
*H04L 29/08* (2006.01)
*H04L 29/06* (2006.01)
*H04W 52/02* (2009.01)
*H04W 88/04* (2009.01)

(52) U.S. Cl.
CPC .............. *H04L 67/16* (2013.01); *H04L 63/08* (2013.01); *H04W 52/0229* (2013.01); *H04W 88/04* (2013.01); *Y02B 60/50* (2013.01)

(58) Field of Classification Search
USPC ............................................... 726/4; 709/225
See application file for complete search history.

(56) References Cited

U.S. PATENT DOCUMENTS

| 8,249,499 | B2 * | 8/2012 | Waung et al. | 455/7 |
| 8,335,854 | B2 | 12/2012 | Eldering | |
| 9,059,862 | B2 * | 6/2015 | Shaikh | |
| 2007/0217335 | A1 * | 9/2007 | Jayaraman et al. | 370/235 |
| 2011/0028085 | A1 | 2/2011 | Waung et al. | |
| 2012/0173901 | A1 | 7/2012 | Soliman et al. | |

OTHER PUBLICATIONS

"International Search Report & Written Opinion for PCT Patent Application No. PCT/US2013/059326", Mailed Date: Jan. 28, 2014, Filed Date: Sep. 12, 2013, 11 Pages.

Agarwal, et al., "On Demand Paging Using Bluetooth Radios on 802.11 Based Networks", In Technical Report #03-22, Center for Embedded Computer Systems, University of California, Jul. 2003, pp. 1-19.

(Continued)

*Primary Examiner* — Beemnet Dada
(74) *Attorney, Agent, or Firm* — Judy Yee; Harri Valio; Micky Minhas (57) ABSTRACT

An access point device is configured to improve usability of tethering, while improving battery life and managing data usage among and by the tethered devices. Both access point devices and client devices can remain in a low power state without a high power radio being powered until a shared network connection is to be used. To establish a connection to a network for the client device, the client device communicates with the access point device over a lower power communication device, such as a low power radio. The access point device activates its higher power radio. The two devices then connect over the high power radio, allowing the client device to then to use the access point device as a router to connect to a computer network.

28 Claims, 5 Drawing Sheets (56) References Cited

OTHER PUBLICATIONS

Camps-Mur, et al., "Device to Device Communications with WiFi Direct: Overview and Experimentation", Retrieved at <<http://enjambre.it.uc3m.es/~agsaaved/papers/2012_camps_wircommag.pdf>>, In IEEE Wireless Communications Magazine, Dec. 2012, pp. 8.

Dunkels, A., "SICSlowpan—Internet-Connectivity for Low-Power Radio Systems", Retrieved at <<http://www.iis.se/docs/SICS_Lowpan-report.pdf>>, Retrieved Date: Feb. 9, 2013, pp. 17.

Pinola, Melanie., "Wi-Fi Direct", Retrieved at <<http://mobileoffice.about.com/od/wifimobileconnectivity/p/wi-fi-direct.htm>>, Retrieved Date: Feb. 9, 2013, p. 1.

Camps-Mura, et al., "Designing Energy Efficient Access Points with Wi-Fi Direct", Retrieved at <<http://xavierperezcosta.com/publications/wifi_direct_CN.pdf>>, In Journal of Computer Networks, vol. 55, Issue 13, Sep. 2011, pp. 18.

Shih, et al., "Wake on Wireless: An Event Driven Energy Saving Strategy for Battery Operated Devices", Retrieved at <<http://research.microsoft.com/en-us/um/people/bahl/Papers/Pdf/mobicom02.pdf>>, In Proceedings of the 8th Annual International Conference on Mobile Computing and Networking, Sep. 23, 2002, pp. 12.

Angel, Jonathan., "Wi-Fi Direct Networks Will Work Without Base Stations", Retrieved at <<http://www.windowsfordevices.com/c/a/News/WiFi-Direct/>>, Oct. 25, 2010, pp. 3.

\* cited by examiner

EFFICIENT AUTOMATIC SHARING OF NETWORK ACCESS AMONG DEVICES

BACKGROUND

Computer users commonly have one device, herein called a client device, such as a notebook or tablet computer, which connects to a computer network such as the Internet through another device, herein called the access point device, such a mobile phone. Such a shared connection is commonly called "tethering," "Internet sharing," or a "personal hotspot." The access point device is used by the client device as a router to access the Internet. A specific example implementation is a computer with a Wi-Fi link connected to a mobile phone with a 4G connection to the Internet.

Typically, setting up a tethered connection involves several steps, such as enabling tethering on an access point device that is connected to a network, establishing a connection between the access point device and a client device, and then enabling the client device to communicate over the network connection of the access point device. A proper disconnection upon termination of tethering also is desirable, and takes several steps. While some of these steps can be automated, in such implementations the access point device has a wireless connection that is powered on even when it is not in use, which can drain power from the battery of the access point device.

Such connections generally share bandwidth equally among the different devices. Such sharing generally does not consider actual data usage by the devices, total data usage and costs of the client device accessing the network through the access point device.

SUMMARY

This Summary introduces selected concepts in simplified form that are further described below in the Detailed Description. This Summary is intended neither to identify key or essential features of the claimed subject matter, nor to limit the scope of the claimed subject matter.

An access point device is configured to improve usability of tethering, while improving battery life and managing data usage among and by the tethered devices. Both access point devices and client devices can remain in a low power state without a high power radio being powered until a shared network connection is to be used. To establish a connection to a network for the client device, the client device communicates with the access point device over a lower power communication device, such as a low power radio. The access point device activates its higher power radio. The two devices then connect over the high power radio, allowing the client device to then to use the access point device as a router to connect to a computer network.

In the event that two devices are not configured to automatically recognize each other and connect securely over their low power connection devices, a process can be implemented to allow such configuration by using a shared secret of two devices that connect to a shared storage service. After exchanging connection information and the shared secret through the shared storage service, the two devices can use a challenge/response protocol to authenticate each other. Such authentication can occur automatically after detection that the devices are in each other's proximity After authentication, the devices can then connect.

If available battery power in the access point device becomes low, then network sharing can terminate. Similarly, if the client device activity on the network is idle, then network sharing can terminate. After terminating network sharing, the high power radio status can be changed, e.g., powered off or placed in a low power state. Such actions can help manage batter power usage.

Network usage also can be controlled based on cost considerations of such usage by the client devices. With multiple devices sharing the network access, network usage also can be controlled based on relative priorities of the usage by the devices.

Accordingly, In one aspect, a client device connects with an access point device over a connection using a low power communication device. The client device sends, over the connection using the low power communication device, a message to the access point device instructing the access point device to activate a high power radio in the access device. The client device detects if a connection to the access point device is available using its high power radio. The client device connects to the access point device over a connection using the high power radio, and requests sharing of network access of the access point device using the connection on the high power radio.

In another aspect, an access point device connects with a client device over a connection using a low power communication device. The access point device receives, over the connection using the low power communication device, a message from the client device instructing an access point device to activate its high power radio. The access point device connects with the client device over a connection using the high power radio, and initiates sharing of network access with the client device using the connection on the high power radio.

In another aspect, a system includes a client device and an access point device. The devices connect over a connection that uses low power communication devices. The client device sends, over the connection using the low power communication devices, a message to the access point device instructing the access point device to activate its high power radio. After the access point device activates its high power radio, and the devices connect over a connection using the high power radio, the access point device activates sharing of its network access, and the client device can request sharing of that network access.

In another aspect, a client device is connected to an access point device over a high power radio, and sharing network access provided by the access point device. In response to operating conditions, the access point device terminates the connection on the high power radio. Such operating conditions include, but are not limited to, available battery power of the access point device dropping below a threshold or a time out condition due to inactivity on the connection over the high power radio. After termination of the connection on the high power radio, such connection can be restarted by communication over a connection between the devices using low power communication devices.

In another aspect, a client device connects with an access point device over a connection using a low power communication device. The client device accesses a shared secret in shared storage. Using the shared secret, the client device authenticates the access point device. After authentication, the client device configures to communicate with the access point device over the connection using the low power communication device.

In another aspect, an access point device connects with a client device over a connection using a low power communication device. The access point device accesses a shared secret in shared storage. Using the shared secret, the access point device authenticates the client device. After authentication, the access point device configures to communicate with the client device over the connection using the low power communication device.

In another aspect, a system includes a client device and an access point device that can connect to shared storage. Both devices initiate a connection using a low power communication device. The devices access a shared secret in the shared storage. Using the shared secret, the devices authenticate each other. After authentication, the devices are then configured to communicate with each other over the connection using the low power communication device.

In another aspect, a client device is connected to an access point device over a high power radio, and sharing network access provided by the access point device. Usage of the shared network access in controlled according to costs associated with such usage.

The various aspects described above can be embodied in a client device, access point device or system comprising the two, in processes performed by such devices, and/or in computer storage devices including computer program instructions that, when executed, perform such processes and/or configure such devices.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which two devices connect to share access to a computer network.

Figure 1:
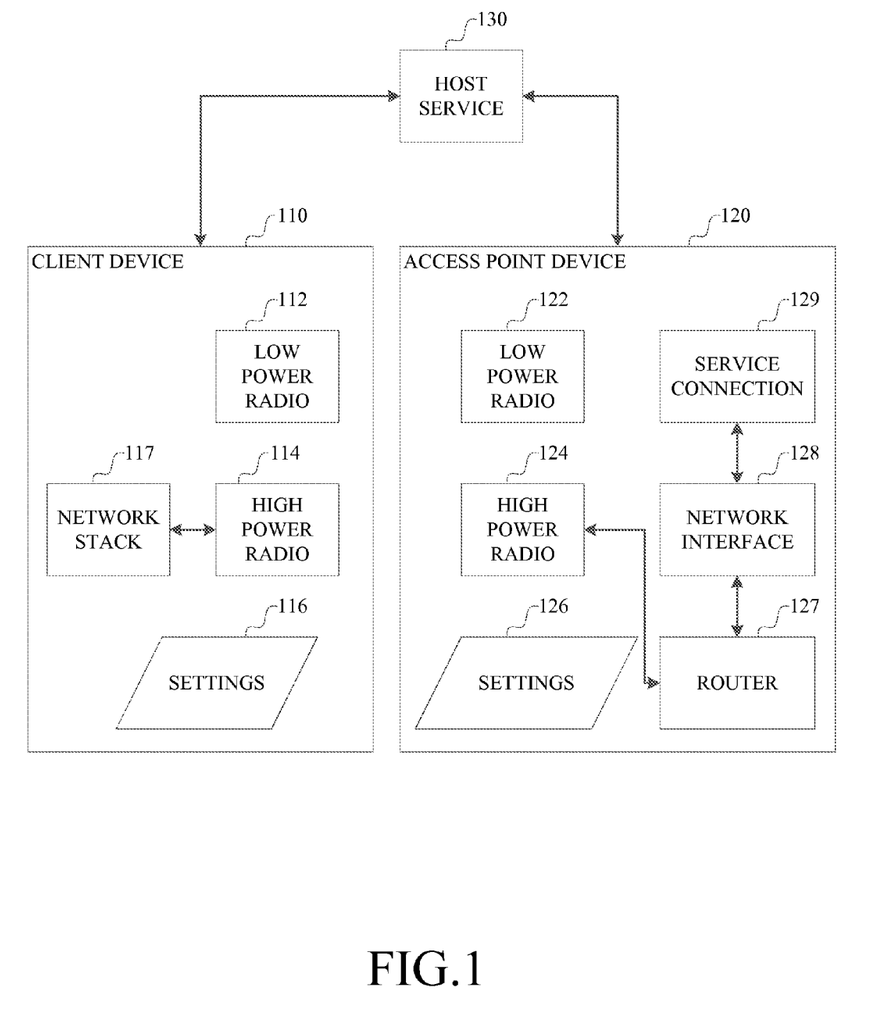
FIG. 1 is a block diagram of an example system in which two devices connect to share access to a computer network.

Referring to FIG. 1, a system 100 includes a first device 110, herein called a client device, and a second device 120. The second device is referred to as an access point device. Both devices can be implemented using a computing device such as described in more detail below in connection with FIG. 5. A likely implementation includes a client device that is a personal computer, notebook computer or tablet computer, or the like. The access point device can be, for example, a mobile phone. Another likely implementation includes an access point device that is a personal computer, notebook computer, tablet computer or the like. The client device can be other computing devices such as mobile phones, personal computers, notebook computers, tablet computers or the like. For example, friends and family of a user might request the user to permit them to access a network using the user's computing device as an access point.

Both the client device and the access point device have a first wireless communication system 112, 122, respectively, and a second wireless communication system 114, 124, respectively. Both generally have device drivers and firmware that maintain a connection and communicate messages, and are resources through which message processing is managed by the operating system. The power consumed by the first wireless communication system is less than the power consumed by the second wireless communication system. Accordingly, the first wireless communication system is called a low power radio and the second wireless communication system is called a high power radio. In this context, "high" and "low" serve as labels of the wireless communication system that describe their power consumption relative to each other, and not their absolute power consumption. Thus, "low" power radio consumes less power than the "high" power radio. In one implementation, the low power radio is implemented using a Bluetooth connection, and the high power radio is implemented using a wireless local area network, such as those based on the Institute of Electrical and Electronics Engineers (IEEE) 802.11 series standards, including but not limited to Wi-Fi and Wi-Fi Direct connections.

In one implementation, the first wireless communication system can be replaced with any low power communication device, including a wired connection instead of a wireless connection, such as provided by a serial bus, including but not limited to a universal serial bus (USB) connection. The example described below refers to a low power radio, but are equally applicable to implementations using a low power communication device that is either wireless or not wireless.

The access point device also includes a network interface 128 that allows the access point device to connect to a computer network. For example, the network interface 128 can connect, over a communication service connection 129 such as a mobile broadband connection, such as a 4G mobile communication service, to a service provider that provides Internet access. As a specific example, the access point device can include a mobile broadband device, whether embedded in the device or a peripheral connected to the device. The mobile broadband device can connect to a cellular data network of a mobile operator which in turn provides internet access. A router module 127 in the access point device can be activated to allow other devices to share the network connection through the network interface 128, in a manner typically referred to as "tethering," "Internet sharing," or a "personal hotspot." The network interface and router module typically are implemented in firmware of a mobile phone and are activated to route and process data packets from the various wireless connections. Note that a device can act as either a client device or an access point device.

The high power radio typically provides higher bandwidth and higher data transmission rates than the low power radio or other low power communication device. Therefore, it is desirable to generally use the high power radio to connect the client device to the access point device to share the access point device's Internet connection.

In one implementation, both the client device and the access point device are associated with a same user of a hosted service 130. This hosted service also is implemented using one or more computers, such as described below in connection with FIG. 4, and is programmed to provide a variety of services to users having accounts with the service. The hosted service 130 can include storage for storing user data. This user data can include profiles 116, 126, respectively, for settings for the client device and access point device used by the user. Such settings can include settings for the low and high power radios of these devices. The client device and access point device each can access the host service through applications (not shown) on the respective devices when connected to the Internet or other computer network. When connected to the host service, the applications for the hosted service on the devices can store profile data that can be used as a shared secret in an authentication process described below. Note that the client and access point devices also can connect to computer networks through a wired network interface, in addition to wireless connections.

In a typical usage scenario, a user of the client device intends to access a computer network, such as the Internet, using applications running on the client device. For example, the client device can include a browser application for accessing the Internet, or a file management system for accessing data files stored on networked storage. To connect the client device to a network, a wireless connection between the client device and the access point device is established, preferably over the high power radio. Then Internet sharing is activated by establishing an Internet connection, over the wireless connection, between a network stack 117 in the client device and the router module of the access point device. Sharing of the network connection thus involves the high power radios, their firmware and device drivers, and the operating systems of both devices.

Figure 2:
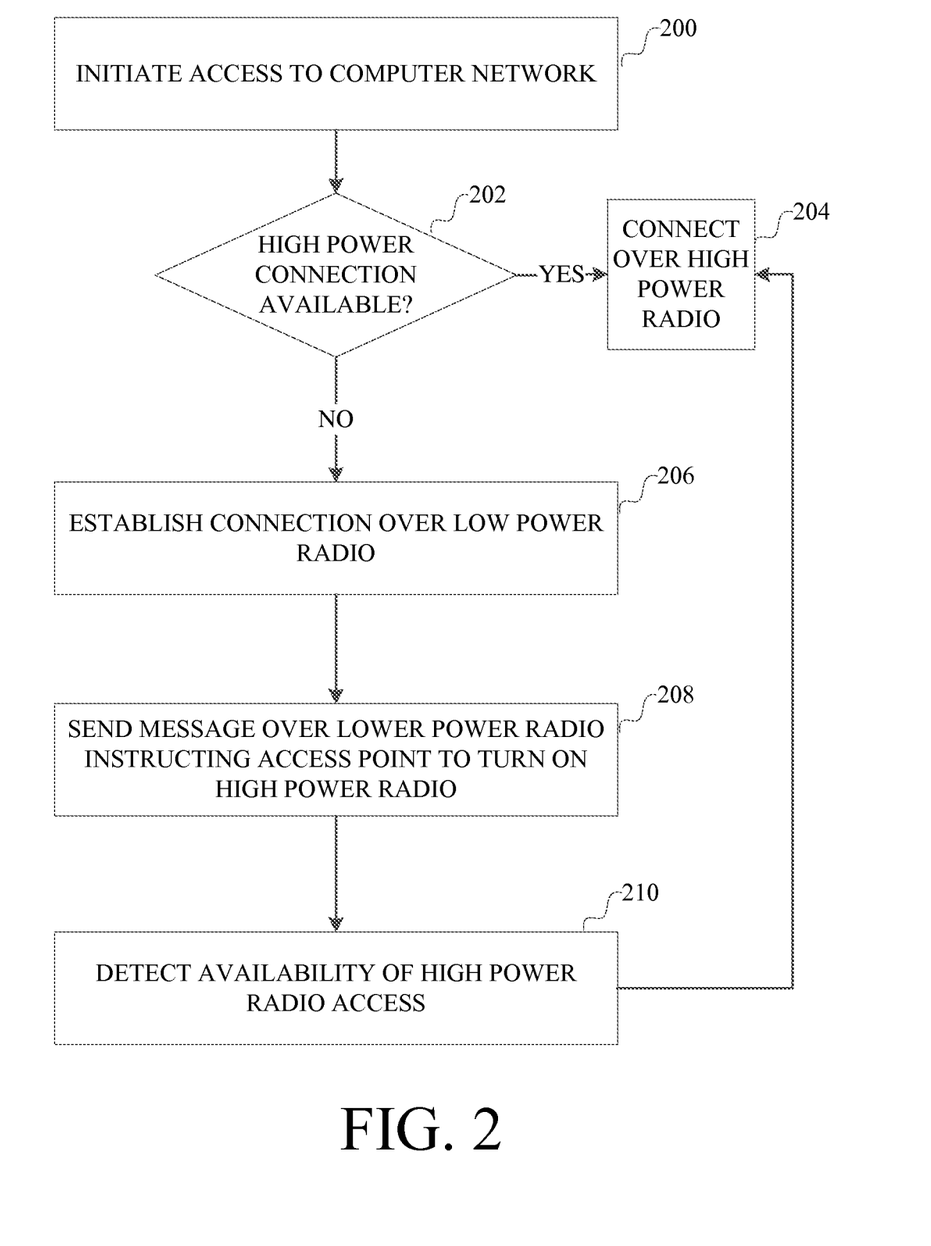
FIG. 2 is a flow chart an example implementation of a process in a client device for causing two devices to connect so as to share access to a computer network.

Given this context, an example implementation of a process for initiating network sharing between the client device and access point device will be described in more detail in connection with FIG. 2. In this process, it is assumed that the high power radio on one or both devices is powered down or is in a low power state, such as one with a very short duty cycle.

The process in initiating network sharing is generally performed by the operating system, which also directs other resources such as device drivers and the radios in the device. This process begins with an action occurring on the client device that initiates 200 access to a computer network, such as the Internet. The action can be user or device initiated. The initiation of the access can be triggered through an application on the client device, or by the operating system of the client device. For example, the user can select a stored network connection in a user interface that presents available or previously used network connections for selection. Such a user interface can indicate the access point device as a network connection that can be selected. The user interface can include a graphical indication that this network connection is a tethered one.

As another example, the user can launch a browser application that accesses the Internet, specifying a uniform resource locator (URL) or other indication of a computer on a network with which the browser application is to communicate. As another example, a user can select a virtual private network (VPN) client application that attempts to access a network such as the Internet. Any other application that initiates an attempt to access a network such as the Internet also can invoke this process. Proximity detection also can be used. Thus, if the client device detects that the access point device is in its proximity, then the client device can invoke this process.

The client device first determines 202 if there is an available connection over the high power radio with the access point device. Such a determination can be made by the operating system. If such a connection is already available, then the client device connects 204 to the access point device over the existing high power radio connection, and activates network sharing. The client device may send a request to the access point to activate network sharing if the high power radio is on, but network sharing is not enabled. If the high power radio connection is not available, then processing continues with step 206, in which the client device establishes a connection with the access point device over the low power radio. The client device sends 208 a message over the low power radio connection to the access point device, instructing the access point device to activate its high power radio connection. For example, the client device can send a message over a Bluetooth connection instructing the access point device to activate a Wi-Fi connection. Instead of a Bluetooth connection, the two devices can communicate over a low band, e.g., 2.4 GHz, channel. After the access point device activates its high power radio, the client device detects 210 the high power radio and then connects 204 to the access point device and activates network sharing.

Figure 3:
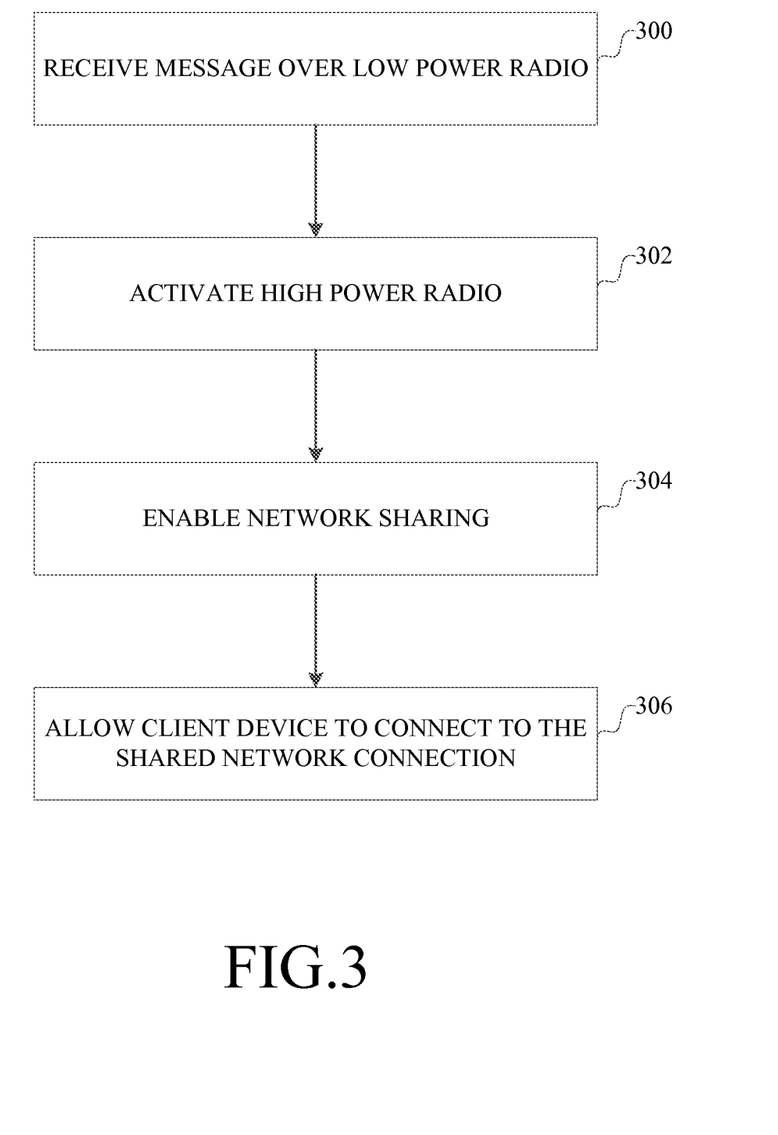
FIG. 3 is a flow chart an example implementation of a process in an access point device for causing two devices to connect to a shared network connection.

Referring now to FIG. 3, the process performed by the access point device is the following. The access point device receives 300 a message over its low power radio, instructing it to activate its high power radio. The access point device then activates 302 its high power radio. The access point also enables 304 its network sharing capability. The access point then allows 306 the client device to connect to the shared the network connection using a connection over the high power radio.

In the foregoing process, if the client device and access point device are in proximity and have already been configured to recognize each other and automatically connect over their low power communication devices, then the client device can request the access point device to turn on the high power radio after the low power radio connection is established.

If however, the client device and access point device have not been configured to recognize each other and automatically connect, which is typical for wireless connections, then a connection over the low power radio is initiated first. For example, using standard Bluetooth connections a manual process is used to connect two devices. First, the access point device is made discoverable. The access point then sends out a message with an identifier to the client device. The client device displays an access code to the user. The user then enters this code on the access point device.

To avoid such manual intervention, a controller for the low power radios in both devices can be programmed to perform a challenge-response protocol, through which the devices are authenticated to each other, after which they are enabled to connect over an encrypted connection. In one implementation, the client device and access point device are associated with the same user of the hosted service 130. This hosted service 130, during prior Internet connections by the respective devices, can provide each device with profile information of the other device. This profile information can be used in a challenge/response protocol between the two devices to authenticate them for recognizing each other and automatically connecting.

Figure 4:
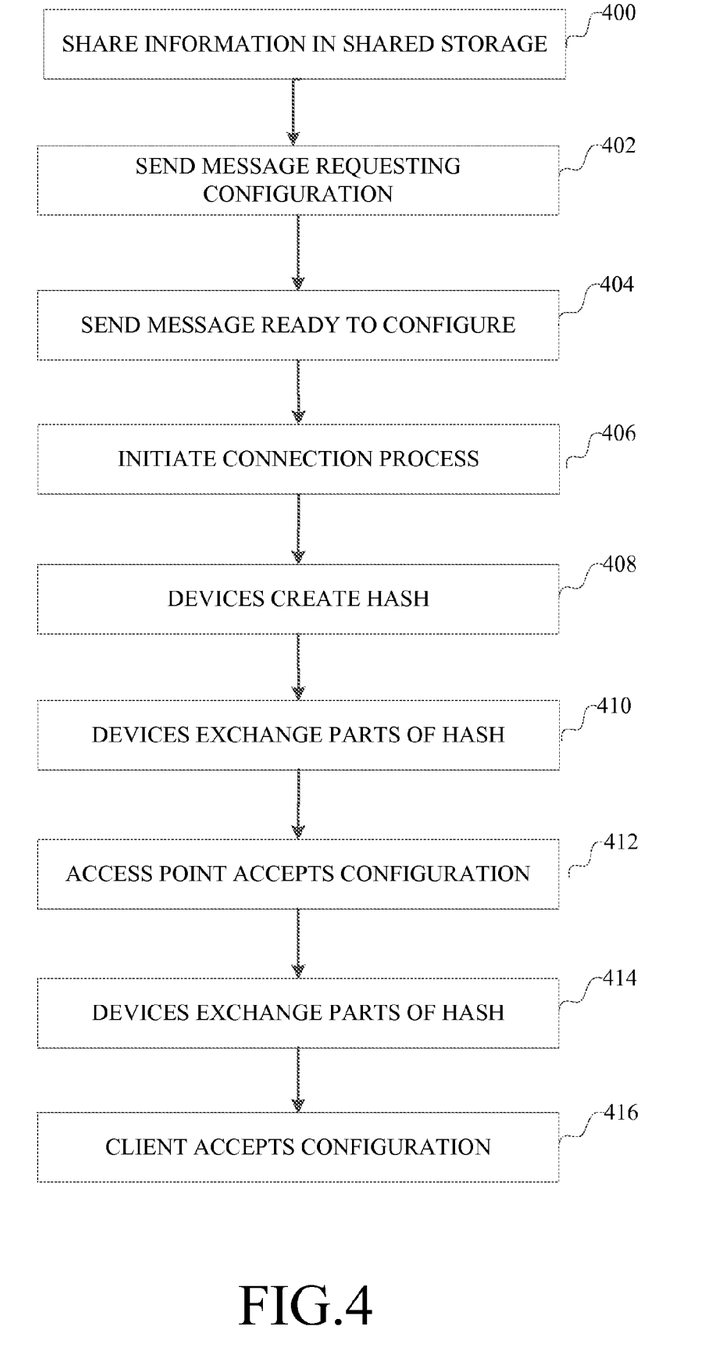
FIG. 4 is a flowchart describing an example implementation of a challenge-response protocol between a client device and an access point device.

An example implementation of such a challenge-response protocol will now be described in connection with FIG. 4.

First, information identifying the two devices, such as MAC addresses for Bluetooth connections, and a shared secret, such as profile information, is shared 400 between the two devices through a shared storage service, such as shown at 130 in FIG. 1. In the Bluetooth protocol, the client device sends 402 the access point device a message indicating that a connection is desired. In response, the access point device sends 404 the client device a message indicating that it is ready to connect. Both devices start 406 a process through which the devices are configured to recognize each other and automatically connect, such as the Bluetooth pairing process which happens radio-to-radio at the radio/firmware layer in the devices.

Next, authentication between the devices is performed by the operating systems of the devices. In one example implementation, both devices take a link key and a numeric comparison string, which are created by the radios during the connection process, and create 408 a hash with the shared secret using a standard hashing algorithm, such as SHA-256. The access point device sends the client device a first part of the resulting hash; the client device sends the access point device the next part of the hash (410). If the response from the client device is correct, then the access point accepts 412 the configuration. Similarly, the client device then sends the access point device the next part of the hash; the access point device sends the client device the next part of the hash (414). If the response from the access point device is correct, then the client device accepts 416 the configuration. After both devices accept, the two devices are configured to recognize each other and securely connect. If at any point an error occurs, then both devices reject the configuration.

In another example implementation, one device generates a random number. The random number is sent to the other device. Both devices compute the hash of the shared secret, the random number and the numeric comparison value. The other device returns the computed value to the first device, which compares the received value with its own computation.

This same configuration and process can be performed for multiple client devices connected to the same access point device.

The access point also can inform the client device of a specific channel to use over the high power radio. This information can be provided in response to the client device requesting access to network sharing, or can be provided as part of the profile information shared through the hosted storage service, or can be provided through any other mechanism.

The access point device also can include a module that monitors and manages usage of data by the client device(s) connected to it. This module can have a variety of settings for managing such usage.

For example, the access point device can include a counter for each client device connection that tracks the amount of data, e.g., a number of packets, used by the client device. A threshold limit can be established for each connection. This threshold can be a user-defined setting.

Priority of usage also can be provided as a setting. For example, if the access point device is being used for data transmission, it may take priority over other devices for data transmission.

With multiple client devices, the access point device can maintain, for each client device, a quality of service setting to provide more accurate prioritization of communication traffic and aggregate data volume limits. Other thresholds associated with a connection, such a data rates and cost of data usage can be used to prioritize connections.

After a connection between the client device and the access point device is made, operating conditions of the access point device and the connection can be monitored. Under some circumstances, in response to the current operating conditions, network sharing and the connection over the high power radio can be terminated to manage power usage by the access point device. In some cases, the high power radio can be disabled, meaning it can be turned off completely or made inactive (but in a ready state), so as to conserve battery power.

In one implementation, a battery power threshold can be set. If the available battery power in the access point device drops under this threshold, then tethering to client devices can be disabled and the high power radio of the access point device can be disabled.

In one implementation, a time threshold can be set. If a period of inactivity by the client device exceeds the time threshold, then tethering to the client device can be timed out, or disabled. This time out of a connection can improve performance for other connected client devices, and or can improve power utilization of the access point device. The high power radio of the access point device can be disabled if no other client device is tethered, so as to conserve battery power.

These techniques can be used alternatively, or in combination, and/or alternatively or in combination with yet other techniques of managing battery power and/or data usage by disabling the high power radio and/or active connections using the high power radio.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, handheld or laptop devices (for example, media players, notebook, tablet and slate computers, cellular and other mobile phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 5:
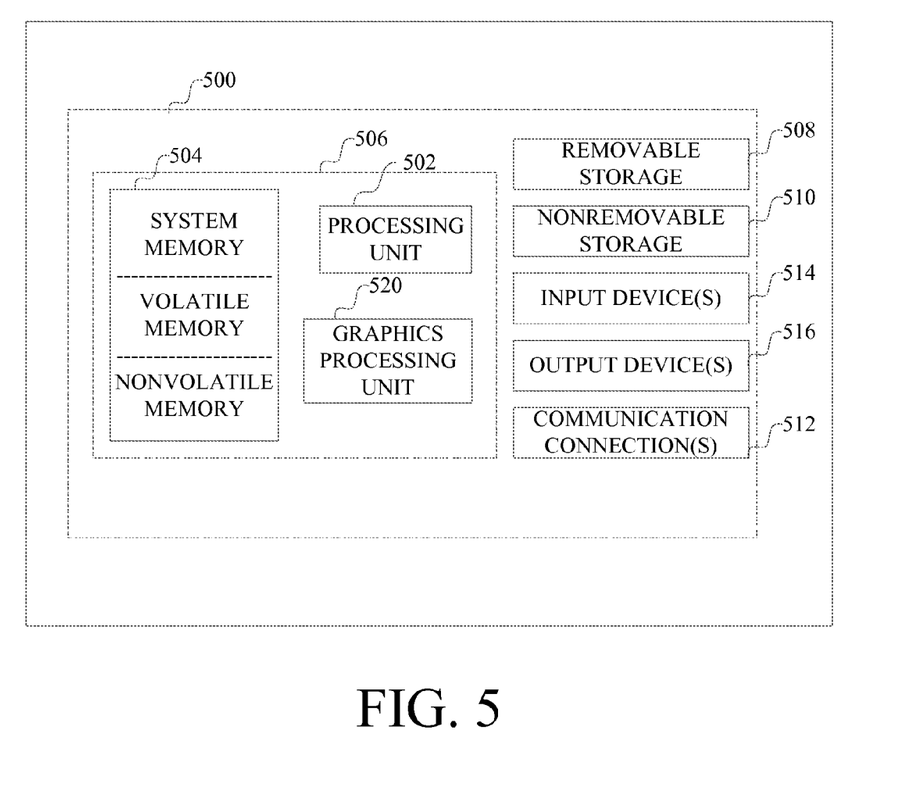
FIG. 5 is a block diagram of an example computer with which components of such a system can be implemented.

FIG. 5 illustrates an example of a suitable computer. This is only one example of a suitable computer and is not intended to suggest any limitation as to the scope of use or functionality of such a computer.

With reference to FIG. 5, an example computer 500, in a basic configuration, includes at least one processing unit 502 and memory 504. The computer may include multiple processing units and/or additional co-processing units such as graphics processing unit 520. Depending on the exact configuration and type of computer, memory 504 may be volatile (such as RAM), non-volatile (such as ROM, flash memory, etc.) or some combination of the two. This configuration is illustrated in FIG. 5 by dashed line 506.

Additionally, computer 500 may also have additional features/functionality. For example, computer 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer program instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 500. Any such computer storage media may be part of computer 500.

Computer 500 may also contain communications connection(s) 512 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 512 are devices that interface with the communication media to transmit data over and receive data from communication media, such as a network interface.

Computer 500 may have various input device(s) 514 such as a keyboard, mouse, pen, camera, touch input device, and so on. Output device(s) 516 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye , and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system enforces licensing restrictions may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed by a processor in a computer as an access point device, comprising:
   connecting with a client device over a first connection using a low power communication device, the connecting comprising:
      accessing a shared secret stored on shared storage, the shared secret and shared storage being accessible over a computer network by the access point device and by the client device,
      authenticating the client device using the shared secret using communication over the low power communication device, and
      in response to authenticating the client device, automatically establishing the first connection over the low power communication device;
   receiving, over the first connection using the low power communication device, a message from the client device instructing the access point device to activate a high power radio in the access point device;
   connecting with the client device over a second connection using the high power radio;
   initiating sharing of a network connection of the access point device with the client device using the second connection on the high power radio.

2. The computer-implemented process of claim 1, further comprising:
   detecting proximity of the client device; and
   wherein connecting with the client device over the connection using the low power communication device is initiated in response to a detection of the access point device being in proximity of the client device.

3. The computer-implemented process of claim 2,
   wherein accessing the shared secret comprises the access point device accessing profile information of the client device from the shared storage.

4. The computer-implemented process of claim 3, further comprising:
   performing a challenge and response protocol using the accessed profile information to authenticate the access point device to the client device before initiating the first connection over the low power communication device between the client device and the access point device.

5. The computer-implemented process of claim 2, further comprising:
   performing a challenge and response protocol using the shared secret to authenticate the access point device to the client device before initiating the first connection over the low power communication device between the client device and the access point device.

6. The computer-implemented process of claim 1, wherein a plurality of client devices share the network connection, and further comprising:
    the access point device maintaining data prioritizing access to the shared network connection by the plurality of client devices.

7. The computer-implemented process of claim 1, wherein the access device provides the shared network connection to a plurality of client devices, and the process further comprises:
    maintaining, by the access device, for each client device of the plurality of client devices, a quality of service setting.

8. The computer-implemented process of claim 7, further comprising:
    the access device prioritizing communication over the shared network connection by the plurality of client devices according to quality of service settings for the plurality of client devices.

9. The computer-implemented process of claim 1, wherein the access device provides the shared network connection to a plurality of client devices, and the process further comprises:
    the access device prioritizing communication over the shared network connection by the plurality of client devices according to thresholds associated with the plurality of client devices for data usage by the plurality of client devices.

10. The computer-implemented process of claim 1, further comprising:
    after initiating the sharing of the network connection, tracking an amount of data used by the client device over the shared network connection; and
    throttling access of the client device to the shared network connection in response to the tracked amount of data used by the client device exceeding a threshold.

11. The computer-implemented process of claim 10, wherein the access device provides the shared network connection to a plurality of client devices, and wherein throttling the access to the shared network connection comprises establishing in the access device the threshold for each client device of the plurality of client devices.

12. The computer-implemented process of claim 11, wherein the threshold is a user-defined setting of the access device.

13. The computer-implemented process of claim 10, wherein tracking the amount of data comprises using a counter in the access device to track a number of packets used by the client device.

14. The computer-implemented process of claim 10, wherein the access device provides the shared network connection to a plurality of client devices, and wherein tracking the amount of data comprises using a counter in the access device for each client device of the plurality of client devices to track a number of packets used by the client device.

15. The computer-implemented process of claim 14, wherein throttling the access to the shared network connection comprises establishing in the access device the threshold for each client device of the plurality of client devices.

16. The computer-implemented process of claim 15, wherein the threshold is a user-defined setting of the access device.

17. A computer-implemented process performed by a processor in an access point device, comprising:
    an access point device communicating data including a shared secret to shared storage;
    the access point device receiving data including a shared secret of a client device from the shared storage;
    the access point device authenticating the client device using the shared secret over a connection using a low power communication device; and
    configuring the client device to automatically recognize and connect with the access point device over the low power communication device;
    receiving, over the first connection using the low power communication device, a message from the client device instructing the access point device to initiate sharing a network connection of the access point device with a plurality of client devices over a connection using a high power radio.

18. The computer-implemented process of claim 17, further comprising setting priority of access according to a type of access by the client device.

19. The computer-implemented process of claim 17, further comprising:
    tracking, by the access point device, an amount of data used by each client device of the plurality of client devices over the shared network connection; and
    the access point device throttling access by each client device to the shared network connection in response to the tracked amount of data used by the client device exceeding a threshold set for the client device.

20. The computer-implemented process of claim 19, wherein tracking the amount of data comprises using a counter for each client device of the plurality of client devices to track a number of packets used by the client device.

21. The computer-implemented process of claim 17, further comprising:
    the client device communicating data including a shared secret to shared storage;
    the client device receiving data including the shared secret from the shared storage;
    the client device authenticating the access point device using the shared secret;
    configuring the client device to automatically recognize and connect with the client device over the low power communication device.

22. The computer-implemented process of claim 17, further comprising:
    detecting the client device in proximity of the access point device; and
    performing the authenticating in response to the detection.

23. The computer-implemented process of claim 17, further comprising the access device, in response to the received message, to initiate sharing of network access:
    activating the high power radio in the access point device;
    establishing the connection over the high power radio with the client device.

24. The computer-implemented process of claim 17, further comprising:
    monitoring operating conditions of the access point device;
    in response to the operating conditions, terminating the connection with the client device on the high power radio.

25. The computer-implemented process of claim 17, wherein after termination of the connection on the high power radio, restarting the connection over the high power radio by communicating over a connection between the client device and the access point device using low power communication devices.

26. An access point device, comprising:
    a processing system comprising at least one processor and memory;

a network interface configured to provide a shared network connection to a computer network;
a low power communication device;
a high power radio;
the processing system configured to:
 access a shared secret stored on shared storage, the shared secret and shared storage being accessible over a computer network by the access point device and by the client device,
 authenticate the client device using the shared secret using communication over the low power communication device, and
 in response to authenticating the client device, automatically establishing the first connection over the low power communication device;
receive, over the first connection using the low power communication device, a message from the client device instructing the access point device to initiate sharing of the network connection with the client device over a second connection using the high power radio.

27. The access point device of claim 26, wherein the processing system is further configured to:
 track an amount of data used by each client device of the plurality of client devices over the shared network connection; and
 throttle access by each client device of the plurality of client devices to the shared network connection in response to the tracked amount of data used by the client device exceeding a threshold set for the client device.

28. The access point device of claim 27, wherein the access point device comprises using a counter, for each client device of the plurality of client devices, configured to track a number of packets used by the client device.

* * * * *